United States Patent
Wilcox (10) Patent No.: US 11,767,948 B2
(45) Date of Patent: Sep. 26, 2023

(54) WALL MOUNT BRACKET FOR MULTIPORTS

(71) Applicant: CORNING RESEARCH & DEVELOPMENT CORPORATION, Corning, NY (US)

(72) Inventor: Dayne Wilcox, El Cerrito, CA (US)

(73) Assignee: Corning Research & Development Corporation, Corning, NY (US)

(*) Notice: Subject to any disclaimer, the term of this patent is extended or adjusted under 35 U.S.C. 154(b) by 48 days.

(21) Appl. No.: 17/363,199

(22) Filed: Jun. 30, 2021

(65) Prior Publication Data
US 2022/0010923 A1 Jan. 13, 2022

Related U.S. Application Data (60) Provisional application No. 63/049,739, filed on Jul. 9, 2020.

(51) Int. Cl.
| | | |
|---|---|---|
| *F16M 13/02* | (2006.01) | |
| *F16M 11/10* | (2006.01) | |
| *G02B 6/36* | (2006.01) | |

(52) U.S. Cl.
CPC .......... *F16M 13/02* (2013.01); *F16M 11/10* (2013.01); *G02B 6/3624* (2013.01)

(58) Field of Classification Search
CPC ...... F16M 13/02; F16M 11/10; G02B 6/3624; G02B 6/4466
USPC .......................................... 248/202.1, 205.1
See application file for complete search history.

(56) References Cited

U.S. PATENT DOCUMENTS

| | | | | |
|---|---|---|---|---|
| 2,880,264 A | * | 3/1959 | Ruskin | H02G 3/14 174/67 |
| 4,300,745 A | * | 11/1981 | Peterson | A47H 1/102 248/217.1 |
| 5,045,640 A | * | 9/1991 | Riceman | H01R 13/447 174/67 |
| 5,243,135 A | * | 9/1993 | Shotey | H02G 3/14 174/67 |
| 5,557,067 A | | 9/1996 | Messelhi | |
| 6,229,948 B1 | * | 5/2001 | Blee | G02B 6/483 385/136 |
| 7,653,282 B2 | | 1/2010 | Blackwell et al. | |
| 2009/0060439 A1 | | 3/2009 | Cox et al. | |
| 2009/0266574 A1 | * | 10/2009 | Atkinson | H01R 13/447 174/67 |

(Continued)

FOREIGN PATENT DOCUMENTS

| | | | |
|---|---|---|---|
| EP | 2251728 A1 | 11/2010 | |
| KR | 10-2012-0026785 A | 3/2012 | |

OTHER PUBLICATIONS

European Patent Application No. 21184763.7, Extended European Search Report, dated Nov. 25, 2021; 7 pages; European Patent Office.

*Primary Examiner* — Muhammad Ijaz (57) ABSTRACT

The present disclosure relates to a wall mount bracket having an adjustable receiving area to engage and hold multiports of varying sizes. In some embodiments, the bracket comprises: an attachment plate; a pivot plate coupled to the attachment plate; an adjustable plate coupled to the pivot plate to define a receiving area, wherein the adjustable plate adjustably couples to the pivot plate such that a width of the receiving area can be adjusted to accommodate different size multiports.

9 Claims, 13 Drawing Sheets

(56) References Cited

U.S. PATENT DOCUMENTS

| | | | |
|---|---|---|---|
| 2013/0094127 A1* | 4/2013 | Lu ........................ | F16M 11/06 |
| | | | 361/679.01 |
| 2018/0195662 A1* | 7/2018 | Richter ................. | F16M 13/02 |
| 2018/0198968 A1* | 7/2018 | Heine .................... | H04N 23/51 |
| 2019/0389691 A1* | 12/2019 | Stranieri ............... | B66B 1/3469 |
| 2020/0214913 A1* | 7/2020 | Pettigrew ............. | A61G 3/0209 |
| 2022/0010923 A1* | 1/2022 | Wilcox ................. | F16M 11/10 |

* cited by examiner

WALL MOUNT BRACKET FOR MULTIPORTS

PRIORITY APPLICATION

This application claims the benefit of priority of U.S. Provisional Application No. 63/049,739, filed on Jul. 9, 2020, the content of which is relied upon and incorporated herein by reference in its entirety.

FIELD OF THE DISCLOSURE

The present disclosure relates to a wall mount bracket for multiports. More particularly, the present disclosure relates to a wall mount bracket that is adjustable such that the wall mount bracket can hold multiports of different sizes.

BACKGROUND OF THE DISCLOSURE

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc, all of which are available from Corning Incorporated, with similar products available from other manufacturers.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies and corresponding hardware to hold the connectorized assemblies, while preserving quick, reliable, and trouble-free optical connection to the network.

SUMMARY

The present disclosure relates to a wall mount bracket having an adjustable receiving area to engage and hold multiports of varying sizes.

In one embodiment, a multiport bracket is provided. The multiport bracket comprises: an attachment plate; a pivot plate coupled to the attachment plate, the pivot plate configured to pivot about a pivoting axis; wherein the pivot plate includes a back surface and a first hook structure; an adjustable plate coupled to the pivot plate to define a receiving area, wherein the adjustable plate adjustably couples to the pivot plate such that a width of the receiving area can be adjusted to accommodate different size multiports; wherein the adjustable plate includes a back surface and a second hook structure, the second hook structure along an edge distal to the pivoting axis; and wherein the width of the receiving area is defined as the distance between the first hook structure and the second hook structure.

In another embodiment, the receiving area receives a multiport and is adjustable for securing multiports comprising different widths. In another embodiment, the first hook structure engages with a first groove of the multiport for securing the multiport in the receiving area. In another embodiment, the second hook structure engages with a second groove of the multiport to secure the multiport in the receiving area. In another embodiment, the multiport bracket has an overall width defined by a distance between the first hook structure and the second hook structure, wherein the overall width is up to 3 mm wider than the multiport when the multiport is coupled to the multiport bracket. In another embodiment, the attachment plate includes a tab to hold the pivot plate in place relative to the attachment plate. In another embodiment, the multiport is angled at about 90° relative to the attachment plate. In another embodiment, wherein the adjustable plate includes a slot spanning a portion of the length of the adjustable plate, wherein studs integrally formed with the pivot plate protrude through the slots and provide purchase for caps that couple to the studs and frictionally engage the pivot plate and the adjustable plate.

In one embodiment, a method of attaching a multiport to a multiport bracket, wherein the multiport bracket includes an attachment plate, a pivot plate coupled to the attachment plate and configured to pivot about a pivoting axis, and an adjustable plate adjustably coupled to the pivot plate such that a width of a receiving area can be adjusted to accommodate different size multiports is provided. The method comprises: coupling a first groove of the multiport to a first hook structure of the pivot plate, wherein the edge of the adjustable plate is distal to the pivoting edge; rotating the multiport to contact a back surface of the multiport to a back surface of the pivot plate; coupling a second edge of the multiport to a second hook structure of the adjustable plate adjacent to the pivoting edge; rotating the adjustable plate onto the pivot plate to define the receiving area within which the multiport is received.

In another embodiment, the receiving area is adjustable for securing multiports comprising different widths. In another embodiment, the multiport bracket has an overall width defined by a distance between the first hook structure and the second hook structure, wherein the overall width is up to 3 mm wider than the multiport when the multiport is coupled to the multiport bracket. In another embodiment, the adjustable plate includes a pair of slots substantially spanning a portion of a length of the adjustment plate, wherein the pair of slots are substantially parallel to each other. In another embodiment, studs integrally formed with the pivot plate protrude through the slots and provide purchase for caps that couple to the studs and frictionally engage the pivot plate and the adjustable plate. In another embodiment, the attachment plate is secured to a wall. In another embodiment, the attachment plate includes a tab to hold the pivot plate in place relative to the attachment plate. In another embodiment, the multiport is angled at about 90° relative to the attachment plate.

In one embodiment, a multiport bracket assembly is provided. The multiport bracket assembly comprises: a multiport bracket including: an attachment plate; a pivot plate coupled to the attachment plate, the pivot plate configured to pivot about a pivoting axis; wherein the pivot plate includes a back surface and a first hook structure, the second hook structure along an edge adjacent to the pivoting edge; an adjustable plate coupled to the pivot plate to define a receiving area, wherein the adjustable plate adjustably couples to the pivot plate such that a width of the receiving area can be adjusted to accommodate different size multiports; wherein the adjustable plate includes a back surface and a second hook structure, the second hook structure along an edge distal to the pivoting axis; and wherein the width of the receiving area is defined as the distance between the first hook structure and the second hook structure; a multiport seated in the receiving area and coupled to the first hook structure and the second hook structure, wherein a width of the multiport is substantially equal to the width of the receiving area; and wherein the multiport bracket has an overall width defined by a distance between the first hook structure and the second hook structure, wherein the overall width is up to 3 mm wider than the multiport when the multiport is coupled to the multiport bracket.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

The present disclosure relates to a wall mount bracket having an adjustable receiving area to engage and hold multiports of varying sizes.

Figure 1:
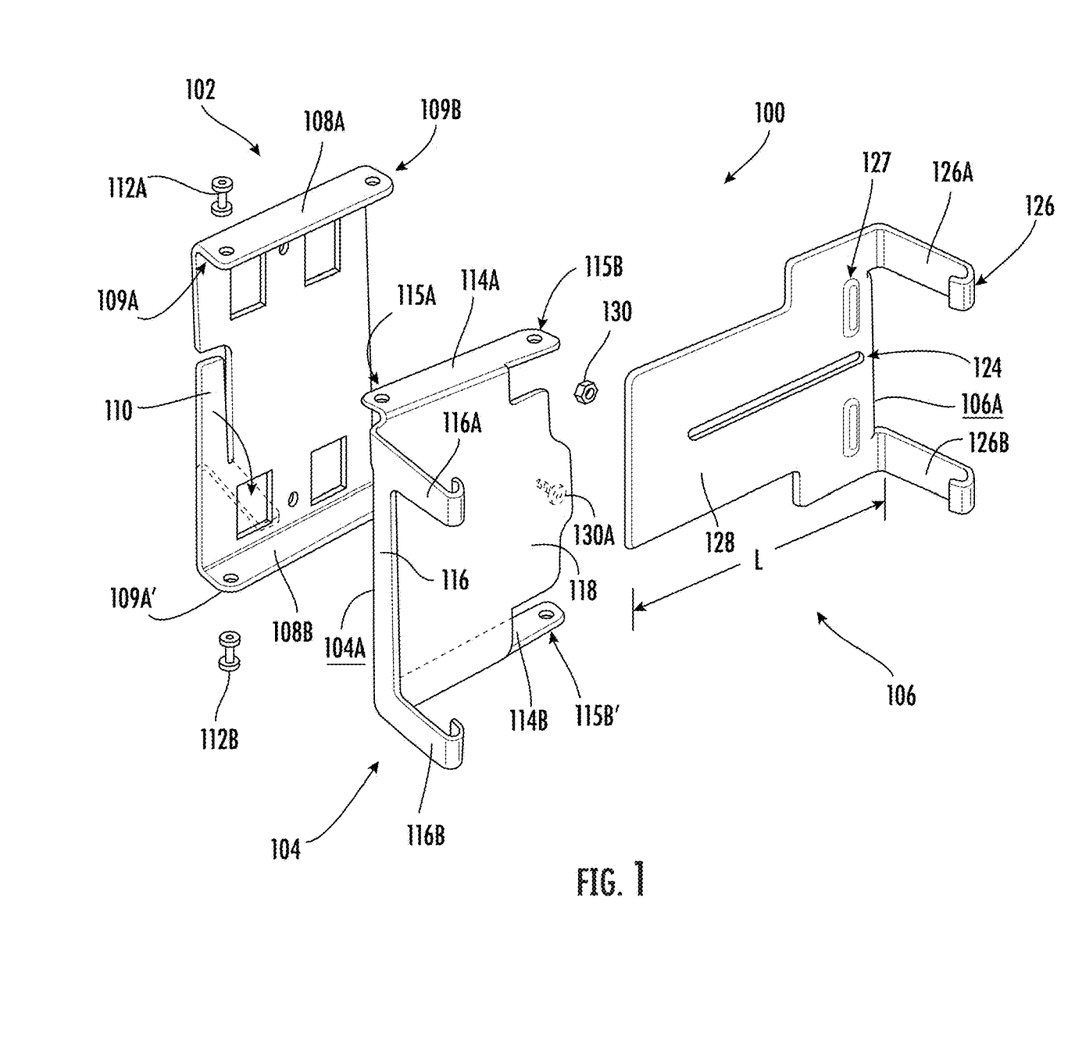
FIG. 1 is an expanded view of a wall mounted bracket configured to hold a multiport in accordance with some embodiments of the present disclosure.

Referring first to FIG. 1, a wall mount bracket 100 (also referred to as "bracket 100") is shown. Bracket 100 includes an attachment plate 102, pivot plate 104, and adjustable plate 106, each of which are coupled to each other as described in greater detail below.

Attachment plate 102 is configured to mount bracket 100 to a wall 101 (FIG. 1A) or like surface (not shown). Attachment plate 102 can be attached to a wall by a variety of methods known in the art (e.g., screws, nails, etc.). In one embodiment, attachment plate 102 is made of stainless steel; however, it is contemplated that in alternate embodiment, other suitable materials may be used, such as aluminum, plastic, or the like. As shown in FIG. 1, attachment plate 102 includes flanges 108A, 108B and tab 110. Flanges 108A, 108B are integrally formed with attachment plate 102 and positioned on opposite edges of attachment plate 102. Flanges 108A, 108B are configured to provide surfaces upon which pivot plate 104 is coupled. As shown, flange 108A has a pair of apertures 109A, 109B. Similarly, flange 108B has a pair of apertures 109A', 109B' where 109A' and 109B' are in vertical alignment with apertures 109A, 109B, respectively. Stated another way, apertures 109A, 109A' and 109B, 109B' are in alignment such that the alignment is substantially parallel with edges 102A, 102B, respectively. As discussed in greater detail below, the alignment between apertures 109A, 109A' and 109B, 109B' can provide a pivoting axis PA (see at least FIGS. 2, 4, and 5) about which pivot plate 104 rotates when pivot plate 104 is coupled to attachment plate 102.

As mentioned previously, attachment plate 102 includes tab 110. Tab 110 is bendable and is configured to hold pivot plate 104 and bracket 100 in an expanded configuration described below. As shown, in some embodiments, tab 110 is bendable such that tab 110 has an angle range relative to edge 102A ranging between about 0° and 90°.

Figure 2:
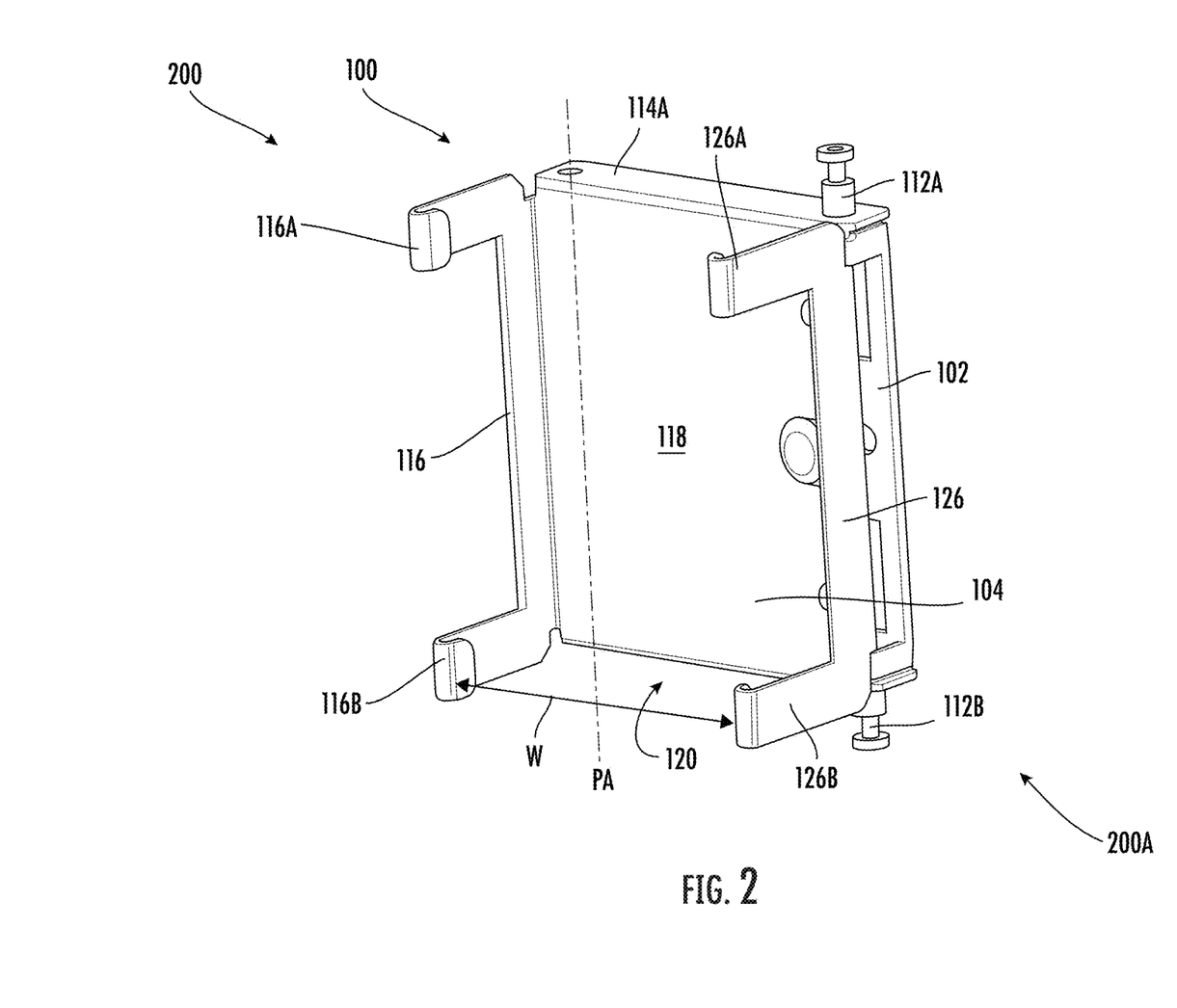
FIG. 2 is a perspective view of an assembled configuration of the wall mounted bracket of FIG. 1.

Pivot plate 104 is pivotably coupled to attachment plate 102 and is configured to rotate/pivot about a pivoting axis PA as described below to move bracket 100 into an expanded configuration (FIG. 3) from an assembled configuration (FIG. 2). Similar to attachment plate 102, pivot plate 104 includes a pair of flanges 114A, 114B located on opposite edges of pivot plate 104 as shown in FIG. 1. Flanges 114A, 114B have corresponding apertures 115A, 115A', 115B, 115B' that align with apertures 109A, 109A', 109B, 109B' such that rivets 112A, 112B can be received in apertures 115A, 115A', 115B, 115B', 109A, 109A', 109B, 109B' to couple pivot plate 104 and attachment plate 102 and to define a pivoting axis PA. In particular, rivets 112A, 112B define a pivoting axis PA at apertures distal to rivets 112A, 112B along flanges 108A, 108B, 114A, 114B.

Pivot plate 104 also includes a hook structure 116 integrally formed with pivot plate 104 and located at an edge 104A of pivot plate 104 and is oriented substantially parallel with and adjacent to pivoting axis PA (see at least FIG. 2) when pivot plate 104 is coupled to attachment plate 102. Hook structure 116 includes a pair of hooks 116A, 116B that are configured to engage with grooves 150A, 150B of a multiport 150 when installing multiport 150 onto bracket assembly 200, 300 as discussed below. FIG. 1 shows an embodiment of hook structure 116 having a pair of hooks 116A, 116B; however, it is within the scope of the present disclosure that hook structure 116 includes a different number of hooks 116A to engage with multiport 150.

Pivot plate 104 includes a back surface 118 with which flanges 114A, 114B and hook structure 116 are integrally formed. As discussed in greater detail herein, back surface 118 forms at least a portion of a back surface of receiving area 120 (see at least FIGS. 2 and 4) configured to receive multiport 150. In some embodiments, back surface 118 comprises the entire back surface of receiving area 120. In some embodiments, back surface 118 comprises a portion of the back surface of receiving area 120 with an exposed portion 122A (FIG. 4) of a back surface 122 of adjustable plate 106 comprising another portion of the back surface of receiving area 120.

Adjustable plate 106 is coupled to pivot plate 104 and can adjust a width W (see at least FIGS. 2 and 4) of receiving area 120 to accommodate varying sizes of multiports 150 as discussed further herein. Stated another way, adjustable plate 106 is coupled to pivot plate 104 such that the width W of receiving area 120 can be adjusted to accommodate varying sizes of multiports 150. As shown in FIG. 1, adjustable plate 106 includes a longitudinal slot 124, a hook structure 126, and a back surface 128. Longitudinal slot 124 is included in back surface 128 and extends along a length L of adjustable plate 106. As shown, in some embodiments, longitudinal slot 124 substantially spans length L of adjustable plate 106. FIG. 1 shows an embodiment where adjustable plate 106 includes one longitudinal slot 124; however, it is within the scope of the present disclosure that in some embodiments, adjustable plate 106 includes more than one slot, such as two slots 124 as shown in at least FIGS. 3-5. Longitudinal slot 124 provides an area through which studs 130A (FIGS. 6F, 9F) of pivot plate 104 can protrude where studs 130A are configured to receive and engage with nuts 130 to couple pivot plate 104 and adjustable plate 106. Nut 130 also holds multiport 150 within receiving area 120 by maintaining the coupled configuration of pivot plate 104 and adjustable plate 106 as discussed herein. It is within the scope of the present disclosure that in alternate embodiments, alternate fastening means may be used (e.g., screws, fasteners, etc.) to couple pivot plate 104 and adjustable plate 106.

Similar to pivot plate 104, adjustable plate 106 includes hook structure 126 that is positioned on an edge 106A of adjustable plate 106 (distal to pivoting axis PA) and is configured to engage with grooves 150A', 150B' (FIGS. 6-9) of a multiport 150 when installing multiport 150 onto bracket assembly 200, 300 as discussed below. FIG. 1 shows an embodiment of hook structure 126 having a pair of hooks 126A, 126B; however, it is within the scope of the present disclosure that hook structure 126 includes a different number of hooks 126A to engage with multiport 150.

Like pivot plate 104, adjustable plate 106 includes a back surface 128 with which hook structure 126 is integrally formed. As mentioned previously, back surfaces 118, 128 of pivot plate 104 and adjustable plate 106, respectively, define a back surface of receiving area 120 configured to receive multiport 150. In particular, the surface area of the back surface of receiving area 120 is defined by back surface 118 and an exposed portion 122A of back surface 128 where the exposed portion 122A is dependent upon the positioning of adjustable plate 106 relative to pivot plate 104.

Figure 3:
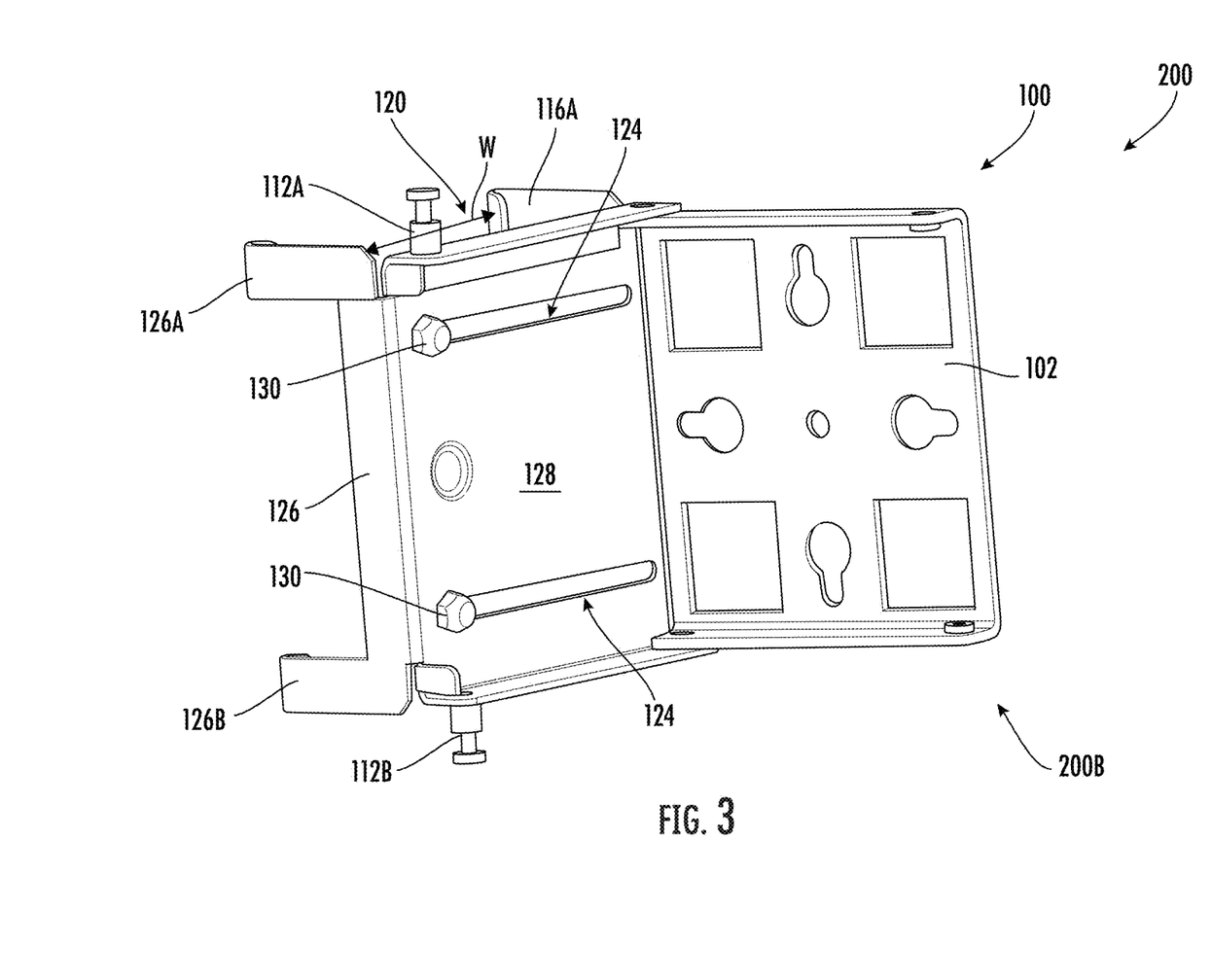
FIG. 3 is a perspective view of an expanded configuration of the wall mounted bracket of FIG. 2.

Referring now to FIGS. 2 and 3, a multiport bracket assembly 200 is shown in an assembled configuration 200A and an expanded configuration 200B respectively without multiport 150. As shown, multiport bracket assembly 200 includes a receiving area 120 sized to receive a 4-port multiport. To transition from assembled configuration 200A to expanded configuration 200B, rivets 112A, 112B are lifted to disengage edge 104A (FIG. 1) of pivot plate 104 from attachment plate 102 such that pivot plate 104 can pivot about pivoting axis PA. Similarly, to transition from expanded configuration 200B to assembled configuration 200A, pivot plate 104 and adjustable plate 106 are pivoted about pivoting axis PA to move edge 104A of pivot plate 104 towards attachment plate 102. Rivets 112A, 112B are lifted, and flanges 114A, 114B of pivot plate 104 engage with flanges 108A, 108B of attachment plate 102 such that apertures 109A, 109B, 109A', 109B', 115A, 115B, 115A', 115B' align. Rivets 112A, 112B are then inserted into apertures 109A, 109A', 115A, 115A' to engage pivot plate 104 in the assembled configuration 200A.

Figure 4:
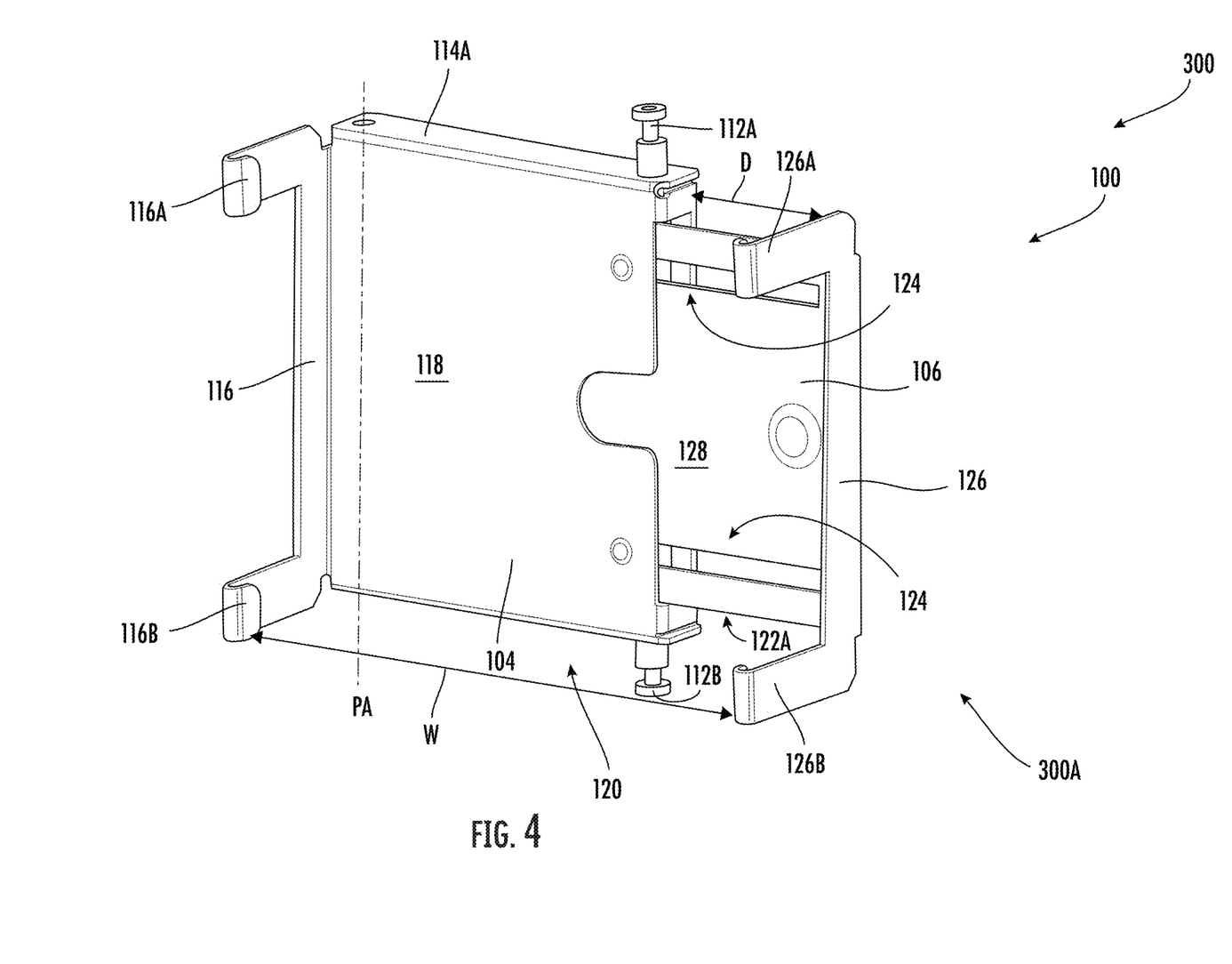
FIG. 4 is a perspective view of an assembled configuration of the wall mounted bracket of FIG. 1 that is configured to hold a larger multiport in accordance with the present disclosure.
Figure 5:
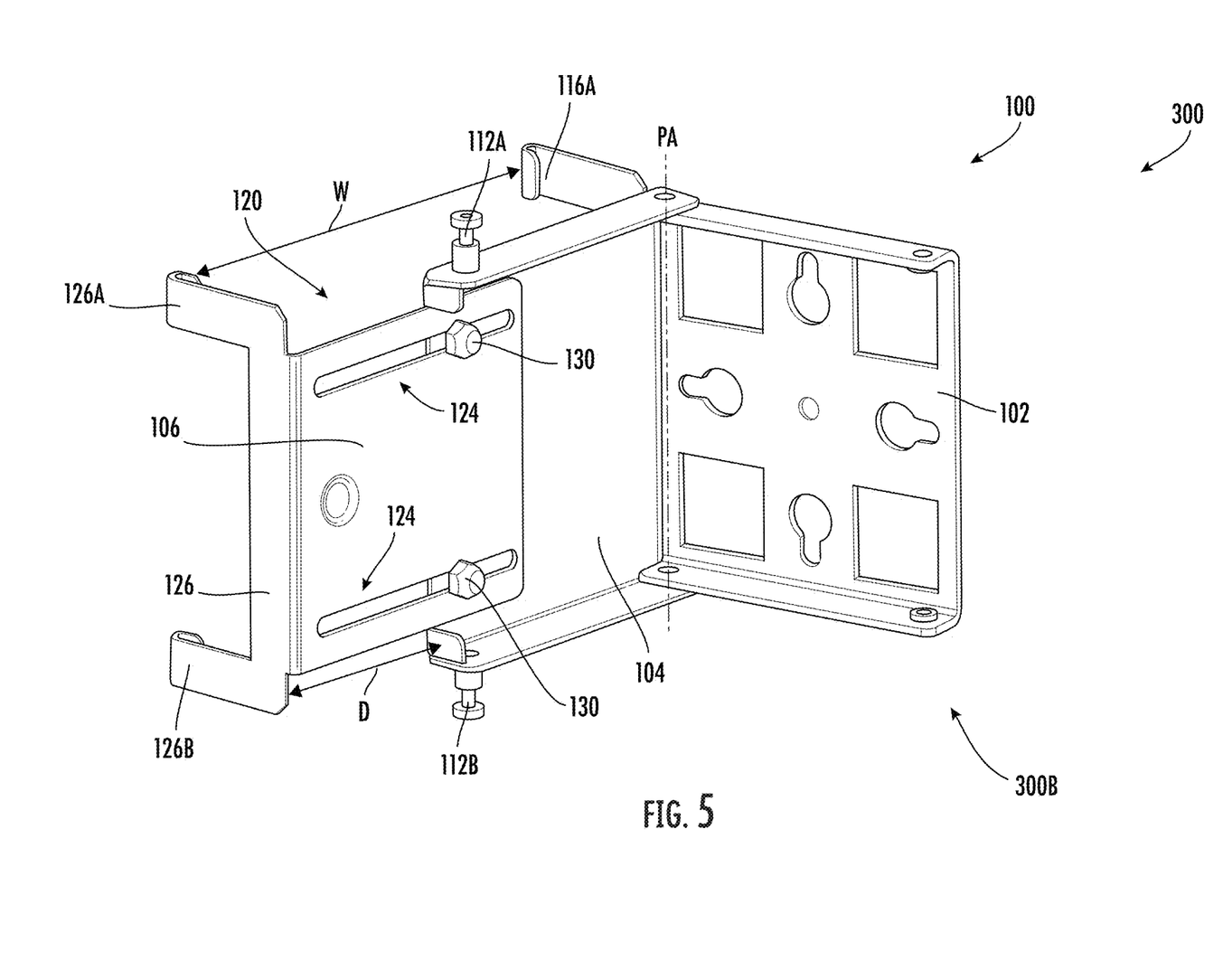
FIG. 5 is a perspective view of an expanded configuration of the wall mounted bracket of FIG. 4.

Referring now to FIGS. 4 and 5, a multiport bracket assembly 300 is shown in an assembled configuration 300A and an expanded configuration 300B. As shown, in comparison to multiport bracket assembly 200, adjustable plate 106 extends a distance D from a distal edge of pivot plate 104 to define exposed portion 122A of back surface 128 and to increase the width W and the surface area of receiving area 120 of multiport bracket assembly 300 such that receiving area 120 can receive a multiport 150 that has more than 4 ports. To transition multiport bracket assembly 300 between assembled configuration 300A and expanded configuration 300B, similar steps are needed as those discussed above in relation to multiport bracket assembly 200.

Figure 7:
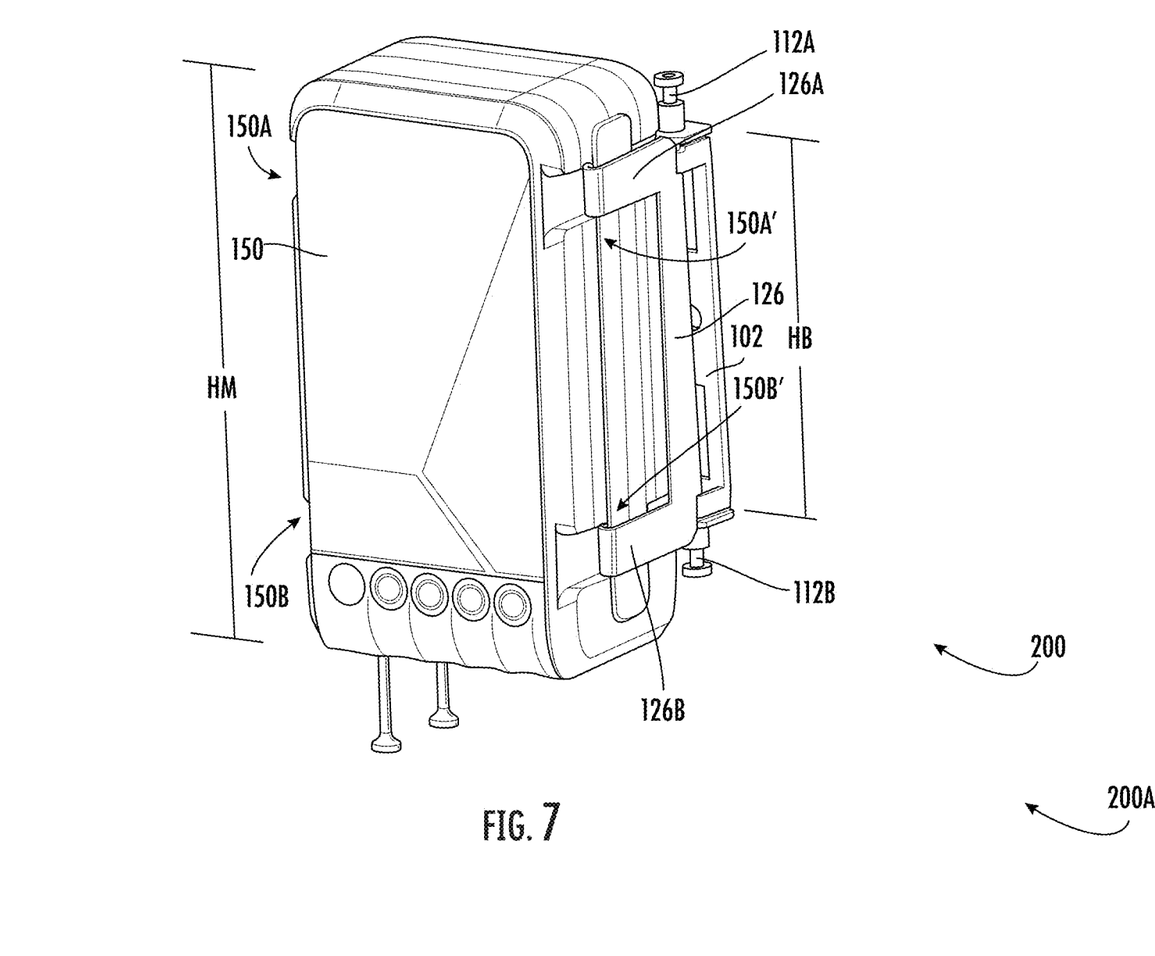
FIG. 7 is a perspective view of the wall mounted bracket of FIG. 3 in the assembled configuration with a multiport coupled to the wall mounted bracket.
Figure 8:
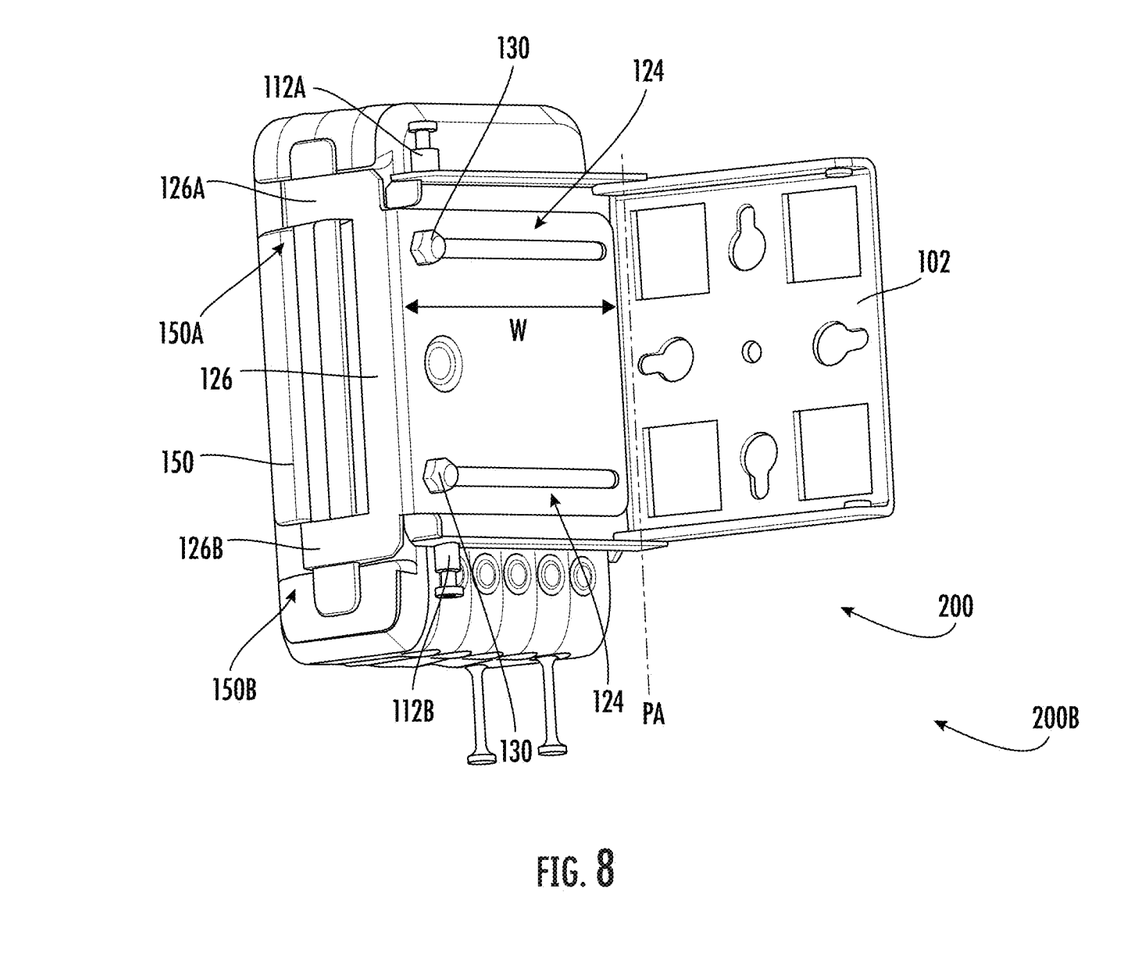
FIG. 8 is a perspective view of the wall mounted bracket of FIG. 3 in the expanded configuration with a multiport coupled to the wall mounted bracket.

Referring now to FIGS. 7 and 8, multiport bracket assembly 200 of FIGS. 2 and 3 is shown with a multiport 150 installed onto bracket 100. General descriptions of multiports (similar to multiport 150, 150' of the present disclosure) are provided in U.S. Pat. No. 10,379,298; International Patent Application No. PCT/US2019/067781; and U.S. Patent Application Publication No. 2020/0049922; the disclosures of which are hereby incorporated by reference. In some embodiments, multiport 150 can have 8 ports; however, it is within the scope of the present disclosure that in alternate embodiments, multiport 150 can have additional ports, such as 10, 12, 14, or 16 ports, for example. Similarly, in some embodiments, multiport 150' (FIGS. 9A-9F) can have 16 ports; however, it is within the scope of the present disclosure that in alternate embodiments, multiport 150' can have additional or fewer ports, such as 10, 12, or 14 ports, for example. As used herein, when referring to the number of ports in multiports 150, 150', the stated number of ports represents two rows of half of said number of ports (e.g., "16 ports" refers to a multiport 150, 150' that has two rows of 8 ports (also referred to as "2×8 multiport")).

Figure 6A:
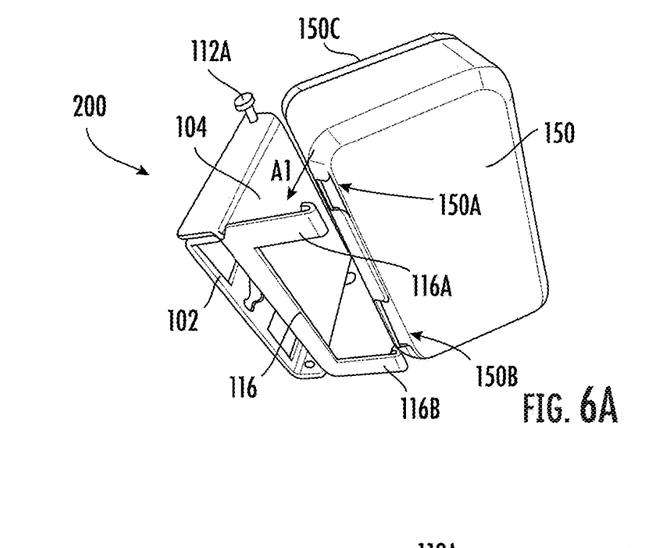
FIGS. 6A-6F are perspective views illustrating a method of assembling the wall mounted bracket of FIG. 2 with a multiport coupled to the wall mounted bracket.
Figure 6B:
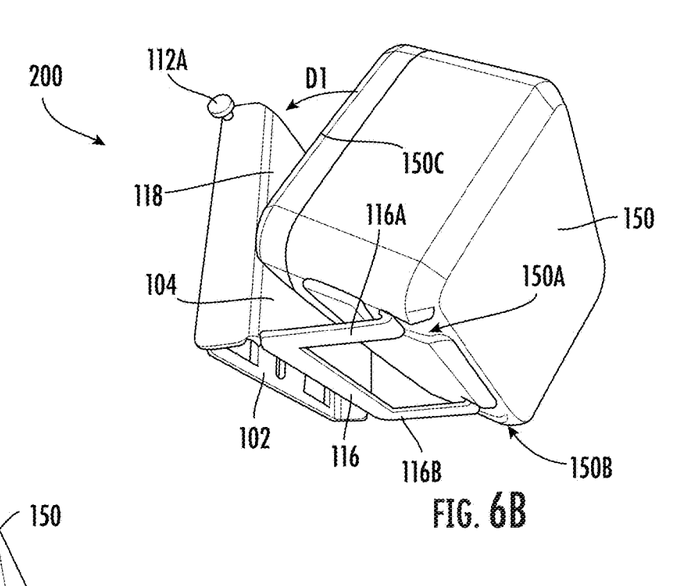
Figure 6C:
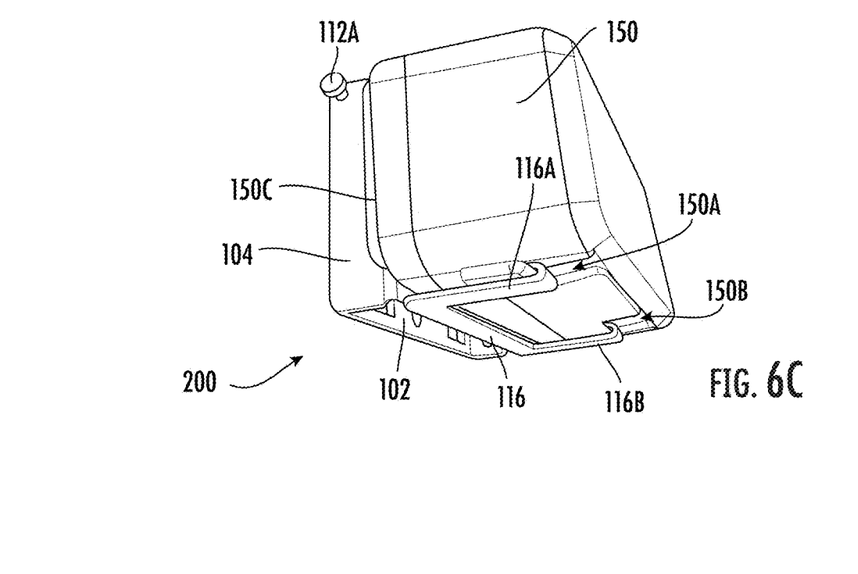
Figures 6D, 6E, 6F:
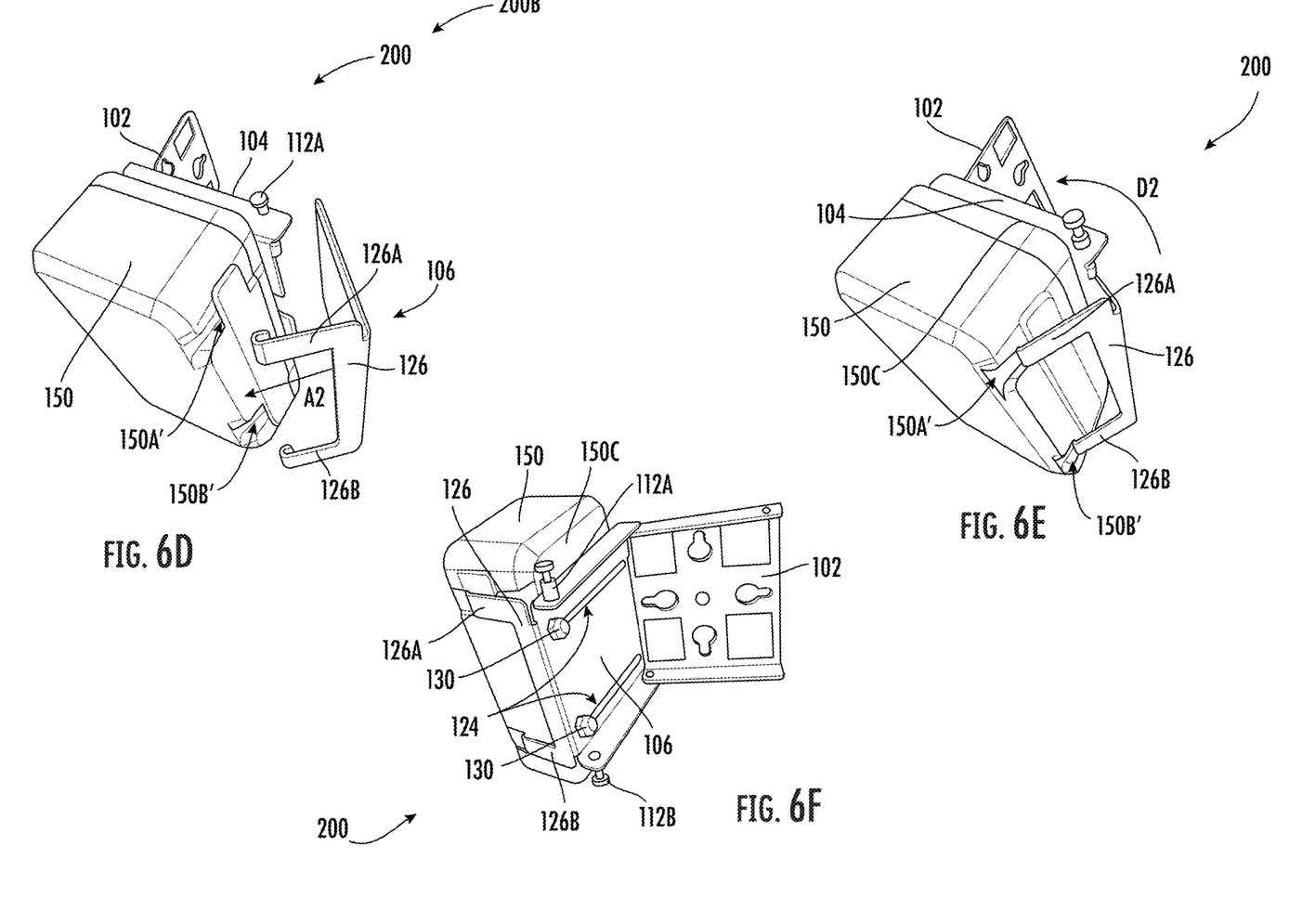

Referring now to FIGS. 6A-6F, installation of multiport 150 onto multiport bracket assembly 200 is shown. Referring first to FIG. 6A, multiport 150 is moved along direction A1 such that hooks 116A, 116B can engage with grooves 150A, 150B of multiport 150 while pivot plate 104 is coupled to attachment plate 102. As shown in FIG. 6B, hook structure 116 of pivot plate 104 engages into grooves 150A, 150B of multiport 150. Once hook structure 116 is engaged onto multiport 150, multiport 150 is rotated about hooks 116A, 116B along direction D1 and seated onto back surface 118 of adjustable plate 106 such that back surface 150C of multiport 150 is in contact with back surface 118 (as shown in FIG. 6C). Stated another way, back surface 150C of multiport 150 is rotated about hooks 116A, 116B and seated into a portion of receiving area 120 as defined by back surface 118 prior to coupling adjustable plate 106. Then, as shown in FIG. 6D, multiport bracket assembly 200 is moved into expanded configuration 200B where pivot plate 104 and attachment plate 102 are angled with respect to each other. In some embodiments, pivot plate 104 and attachment plate 102 are angled at an angle ranging between about 10° and 90°. In this configuration, hook structure 126 of adjustable plate 106 is moved along direction A2 to engage with multiport 150 via hooks 126A, 126B latching onto grooves 150A', 150B'. Upon coupling hooks 126A, 126B onto grooves 150A', 150B', as shown in FIG. 6E, adjustable plate 106 is rotated about hooks 126A, 126B along direction D2 such that back surface 128 of adjustable plate 106 is in contact with pivot plate 104 and studs 130A protrude through longitudinal slots 124 as shown in FIG. 6F. Pivot plate 104 and adjustable plate 106 are then secured by inserting and tightening nuts 130 onto studs 130A to couple pivot plate 104 and adjustable plate 106 thereby maintaining the configuration of pivot plate 104 and adjustable plate 106 with respect to each other. In this way, receiving area 120 is sized to accommodate length LM (FIG. 1A) of multiport 150 as described below.

Figure 1A:
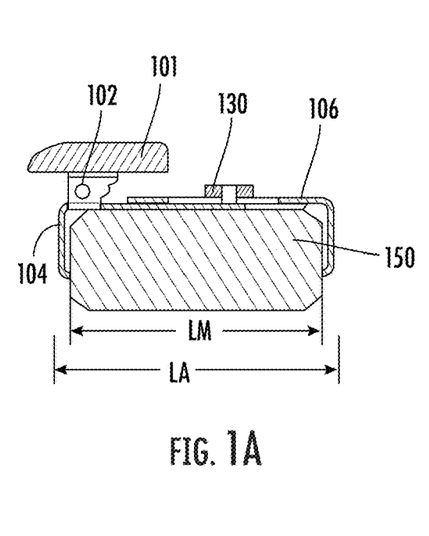
FIG. 1A is a top view of an assembled configuration of the wall mounted bracket of FIG. 1.

Referring briefly to FIG. 1A, a top view of a multiport 150 installed onto multiport bracket assembly 200 is shown. As shown, length LA (from outer edge of pivot plate 104 to outer edge of adjustable plate 106) of multiport bracket assembly 200 is greater than length LM of multiport 150. In some embodiments, the difference between length LA and length LM is up to about 5 mm, up to about 4 mm, or up to about 3 mm. Referring back to FIGS. 7 and 8, height HB of multiport bracket assembly 200 is less than height HM of multiport 150.

Figure 10:
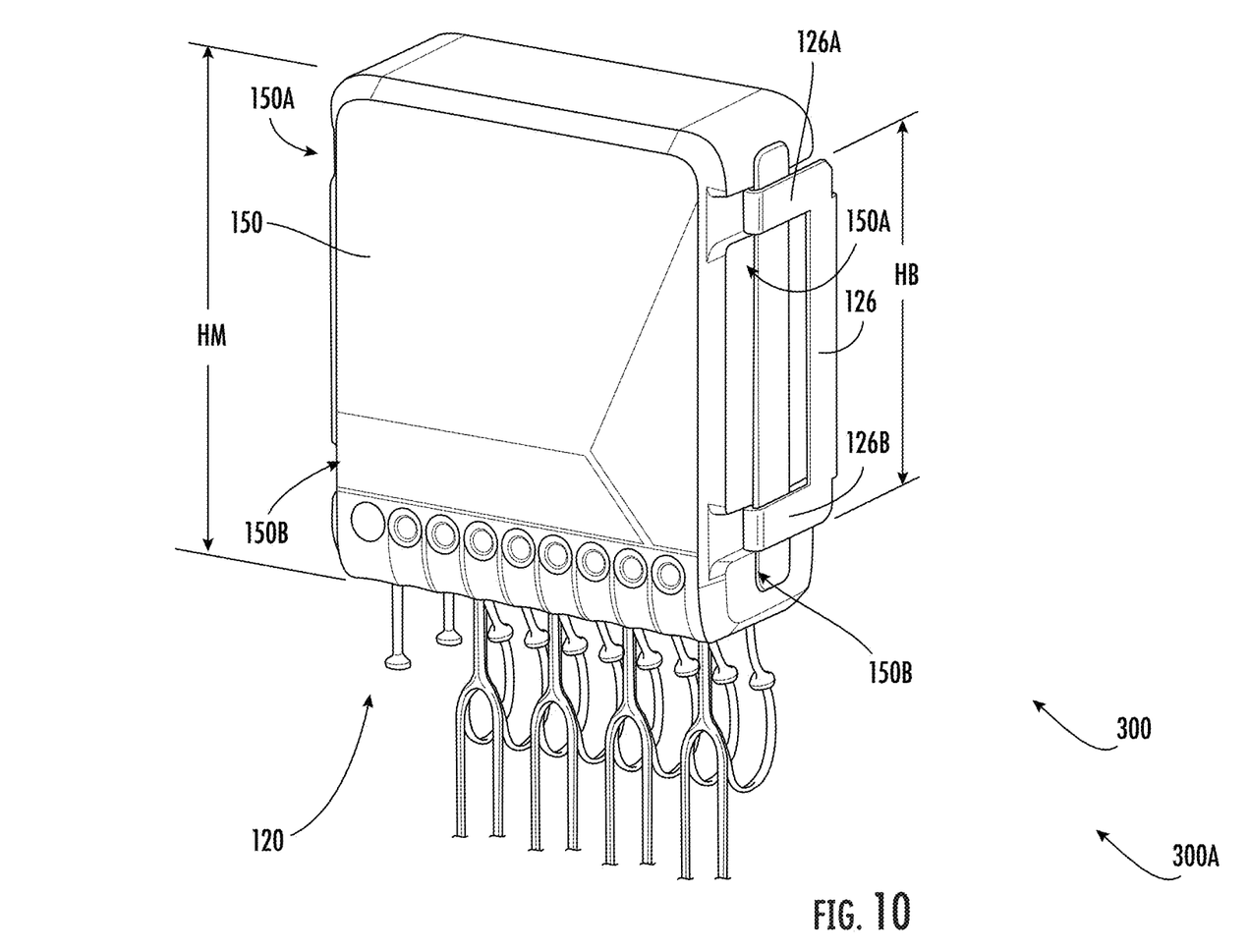
FIG. 10 is a perspective view of the wall mounted bracket of FIG. 4 in the assembled configuration with a multiport coupled to the wall mounted bracket.
Figure 11:
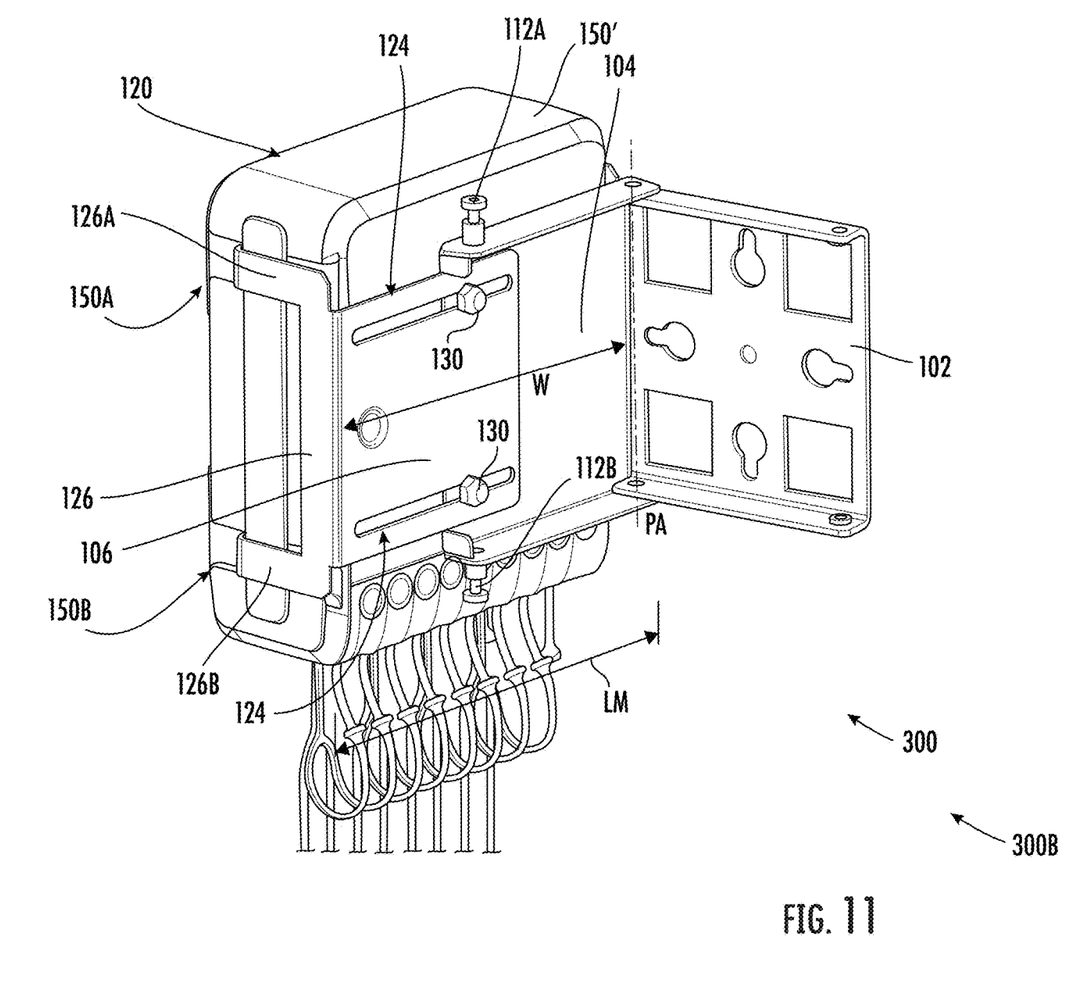
FIG. 11 is a perspective view of the wall mounted bracket of FIG. 5 in the expanded configuration with a multiport coupled to the wall mounted bracket.

Referring briefly to FIGS. 10 and 11, multiport bracket assembly 300 is shown with a multiport 150' installed onto bracket 100. In comparison to FIGS. 7 and 8, multiport 150' has a greater number of ports (i.e., larger length LM) as compared to multiport 150.

Figures 9A, 9B, 9C:
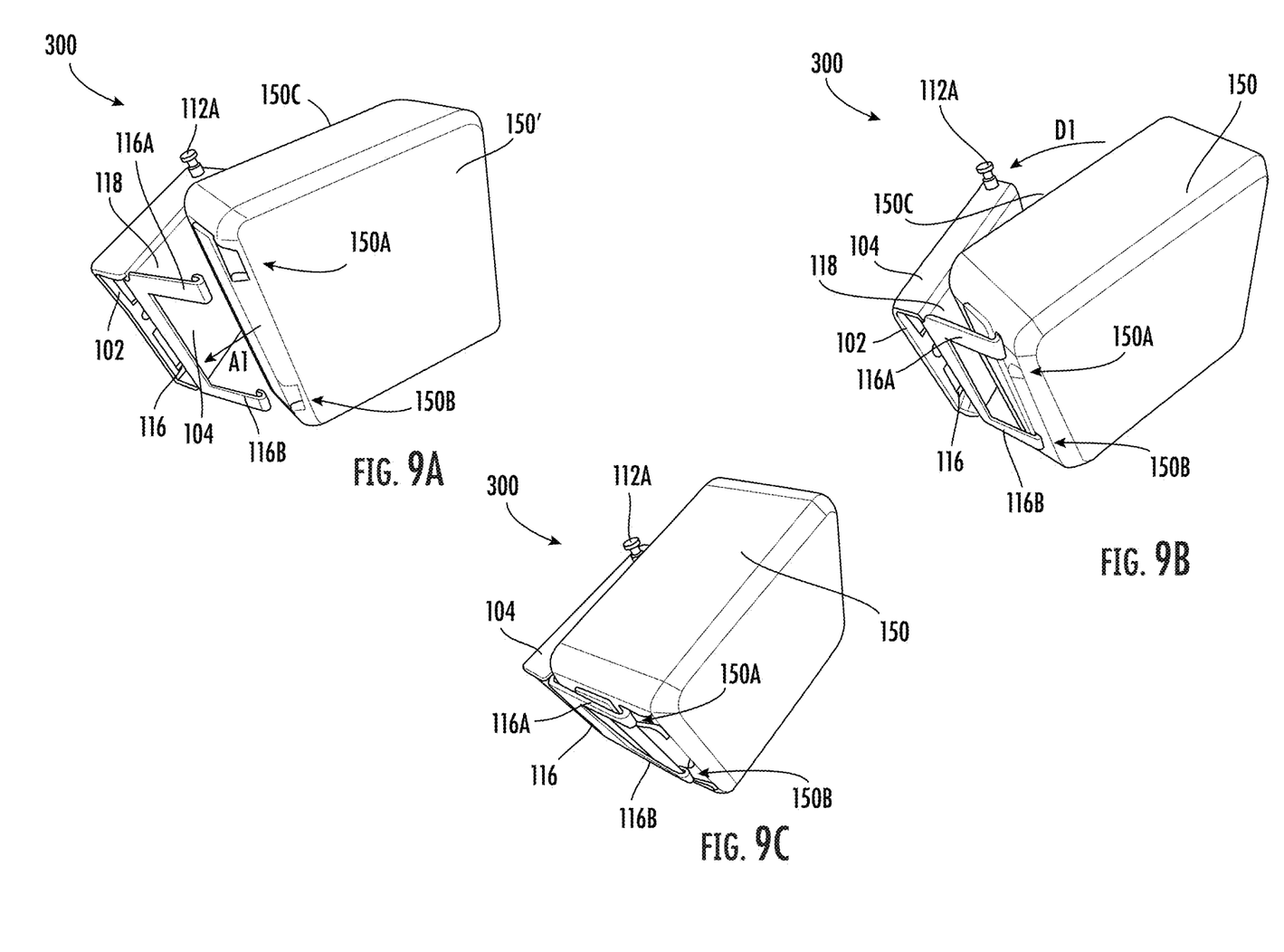
FIGS. 9A-9F are perspective views illustrating a method of assembling the wall mounted bracket of FIG. 4 with a multiport coupled to the wall mounted bracket.
Figure 9D:
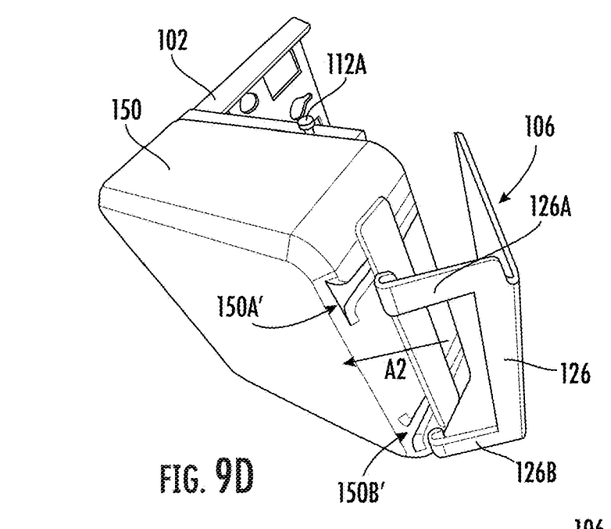
Figure 9E:
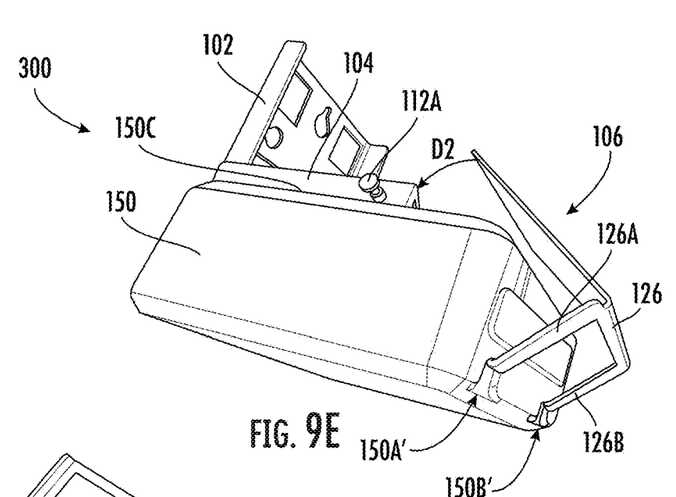
Figure 9F:
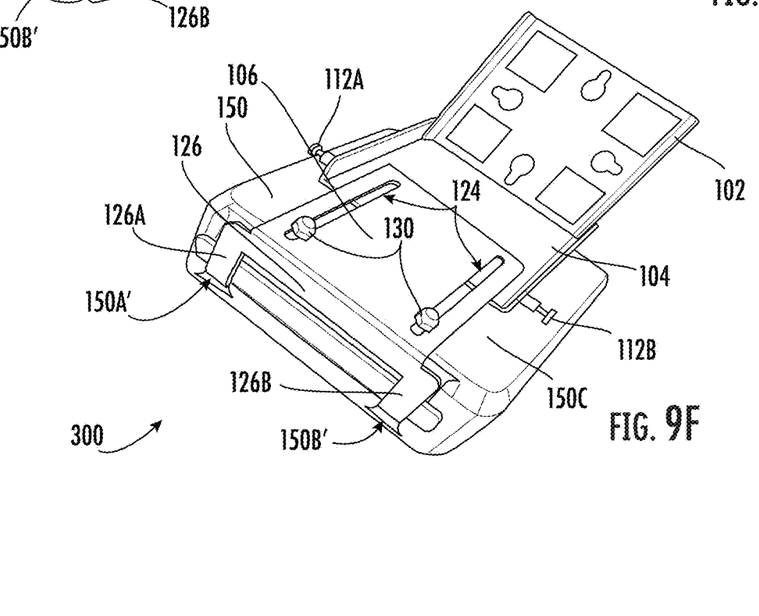

The method to assemble multiport bracket assembly 300 with multiport 150' is the same as the method described above with reference to multiport 150 and multiport bracket assembly 200 (FIGS. 6 and 7) with the exception that multiport 150' is larger than multiport 150. The method is illustrated in FIGS. 9A-9F. Referring first to FIG. 9A, multiport 150' is moved along direction A1 such that hooks 116A, 116B can engage with grooves 150A, 150B of multiport 150' while pivot plate 104 is coupled to attachment plate 102. As shown in FIG. 9B, hook structure 116 of pivot plate 104 engages into grooves 150A, 150B of multiport 150'. Once hook structure 116 is engaged onto multiport 150', multiport 150' is rotated about hooks 116A, 116B along direction D1 and seated onto back surface 118 of adjustable plate 106 such that back surface 150C of multiport 150' is in contact with back surface 118 (as shown in FIG. 9C). Stated another way, back surface 150C of multiport 150' is rotated about hooks 116A, 116B and seated into a portion receiving area 120' as defined by back surface 118 prior to coupling adjustable plate 106. Then, as shown in FIG. 9D, multiport bracket assembly 300 is moved into expanded configuration 300B where pivot plate 104 and attachment plate 102 are angled with respect to each other. In some embodiments, pivot plate 104 and attachment plate 102 are angled at an angle ranging between about 10° and 90°. In this configuration, hook structure 126 of adjustable plate 106 is moved along direction A2 to engage with multiport 150 via hooks 126A, 126B latching onto grooves 150A', 150B'. Upon coupling hooks 126A, 126B onto grooves 150A', 150B', as shown in FIG. 9E, adjustable plate 106 is rotated about hooks 126A, 126B along direction D2 such that back surface 128 of adjustable plate 106 is in contact with pivot plate 104 and studs 130A protrude through longitudinal slots 124 as shown in FIG. 9F. Pivot plate 104 and adjustable plate 106 are then secured by inserting and tightening nuts 130 onto studs 130A to couple pivot plate 104 and adjustable plate 106 thereby maintaining the configuration of pivot plate 104 and adjustable plate 106 with respect to each other. In this way, receiving area 120 is sized to accommodate length LM (FIG. 1A) of multiport 150 as described below.

When assembled, as shown in FIGS. 8 and 9, receiving area 120' is greater than receiving area 120 as the surface area of receiving area 120' is defined by back surface 118 and an exposed portion 122A of back surface 128. Also, as described above and shown in FIG. 1A, length LA of multiport bracket assembly 300 (from outer edge of pivot plate 104 to outer edge of adjustable plate 106) is greater than length LM of multiport 150'. In some embodiments, the difference between length LA and length LM is up to about 5 mm, up to about 4 mm, or up to about 3 mm. Referring back to FIGS. 6 and 7, height HB of multiport bracket assembly 300 is less than height HM of multiport 150'.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. A multiport bracket comprising:
   an attachment plate;
   a pivot plate coupled to the attachment plate, the pivot plate configured to pivot about a pivoting axis;
      wherein the pivot plate includes a back surface and a first hook structure;
   an adjustable plate coupled to the pivot plate to define a receiving area, wherein the adjustable plate adjustably couples to the pivot plate such that a width of the receiving area can be adjusted to accommodate different size multiports;

wherein the adjustable plate includes a back surface and a second hook structure, the second hook structure along an edge distal to the pivoting axis; and wherein the width of the receiving area is defined as a distance between the first hook structure and the second hook structure.

2. The multiport bracket of claim 1, wherein the receiving area receives a multiport and is adjustable for securing different widths of the multiport.

3. The multiport bracket of claim 2, wherein the first hook structure engages with a first groove of the multiport for securing the multiport in the receiving area.

4. The multiport bracket of claim 3, wherein the second hook structure engages with a second groove of the multiport to secure the multiport in the receiving area.

5. The multiport bracket of claim 2, wherein the multiport bracket has an overall width defined by a second distance between the first hook structure and the second hook structure, wherein the overall width is up to 3 mm wider than the multiport when the multiport is coupled to the multiport bracket.

6. The multiport bracket of claim 2, wherein the attachment plate includes a tab to hold the pivot plate in place relative to the attachment plate.

7. The multiport bracket of claim 2, wherein the multiport is angled at about 90° relative to the attachment plate.

8. The multiport bracket of claim 2, wherein the adjustable plate includes a slot spanning a portion of a length of the adjustable plate, wherein studs integrally formed with the pivot plate protrude through the slot and provide purchase for caps that couple to the studs and frictionally engage the pivot plate and the adjustable plate.

9. A multiport bracket assembly comprising:
a multiport bracket including:
an attachment plate;
a pivot plate coupled to the attachment plate, the pivot plate configured to pivot about a pivoting axis;
wherein the pivot plate includes a back surface and a first hook structure, the first hook structure along an edge adjacent to the pivoting axis;
an adjustable plate coupled to the pivot plate to define a receiving area, wherein the adjustable plate adjustably couples to the pivot plate such that a width of the receiving area can be adjusted to accommodate different size multiports;
wherein the adjustable plate includes a back surface and a second hook structure, the second hook structure along an edge distal to the pivoting axis; and
wherein the width of the receiving area is defined as the distance between the first hook structure and the second hook structure;
a multiport seated in the receiving area and coupled to the first hook structure and the second hook structure, wherein a width of the multiport is substantially equal to the width of the receiving area; and
wherein the multiport bracket has an overall width defined by a distance between the first hook structure and the second hook structure, wherein the overall width is up to 3 mm wider than the multiport when the multiport is coupled to the multiport bracket.

* * * * *